(12) United States Patent
LaFaille

(10) Patent No.: US 7,572,348 B2
(45) Date of Patent: Aug. 11, 2009

(54) METHOD AND DEVICE FOR PRINTING OBJECTS

(75) Inventor: Marc Maria Leo Jan LaFaille, Kapellen (BE)

(73) Assignee: Akzo Nobel Coatings International B.V., Arnhem (NL)

( * ) Notice: Subject to any disclaimer, the term of this patent is extended or adjusted under 35 U.S.C. 154(b) by 664 days.

(21) Appl. No.: 10/516,081

(22) PCT Filed: Apr. 24, 2003

(86) PCT No.: PCT/BE03/00072

§ 371 (c)(1),
(2), (4) Date: Nov. 29, 2004

(87) PCT Pub. No.: WO03/101748

PCT Pub. Date: Dec. 11, 2003

(65) Prior Publication Data

US 2005/0150592 A1  Jul. 14, 2005

(30) Foreign Application Priority Data

May 31, 2002  (BE) .................................. 2002/0359

(51) Int. Cl.
*B65H 37/04* (2006.01)
*B29C 65/00* (2006.01)
*B29C 65/48* (2006.01)
*B32B 37/12* (2006.01)
*B32B 38/16* (2006.01)
*G03G 7/00* (2006.01)
*G03G 15/16* (2006.01)
*B29C 65/50* (2006.01)
*B32B 38/18* (2006.01)
*B32B 39/00* (2006.01)

(52) U.S. Cl. ...................... 156/240; 156/230; 156/235; 156/239; 156/281; 156/306.9; 156/307.1; 156/389; 156/540; 399/302; 399/388

(58) Field of Classification Search ................ 156/212, 156/229, 230, 235, 239, 240, 273.3, 275.5, 156/281, 306.9, 307.1, 389, 540, 916; 399/101, 399/154, 297, 302, 388, 397; G03G 7/00, G03G 15/16
See application file for complete search history.

(56) References Cited

U.S. PATENT DOCUMENTS 4,037,008 A * 7/1977 Tugwell ..................... 428/200

(Continued)

FOREIGN PATENT DOCUMENTS

BE  1012584  12/2000

(Continued)

*Primary Examiner*—Philip C Tucker
*Assistant Examiner*—Sonya Mazumdar
(74) *Attorney, Agent, or Firm*—Kenyon & Kenyon LLP

(57) ABSTRACT

Method for printing objects, whereby these objects (15) are provided with a multi-layered print, characterized in that to this aim, on one hand, two or more layers of printing medium (10-11-12), which at least partially are situated one above the other, are provided on a supple carrier (13) and, on the other hand, these layers (10-11-12) are simultaneously transferred onto the object (15) to be printed by bringing said carrier (13), together with the layers of printing medium (10-11-12) present thereon, and the object (15) into mutual contact.

16 Claims, 4 Drawing Sheets

U.S. PATENT DOCUMENTS

Figure 1:
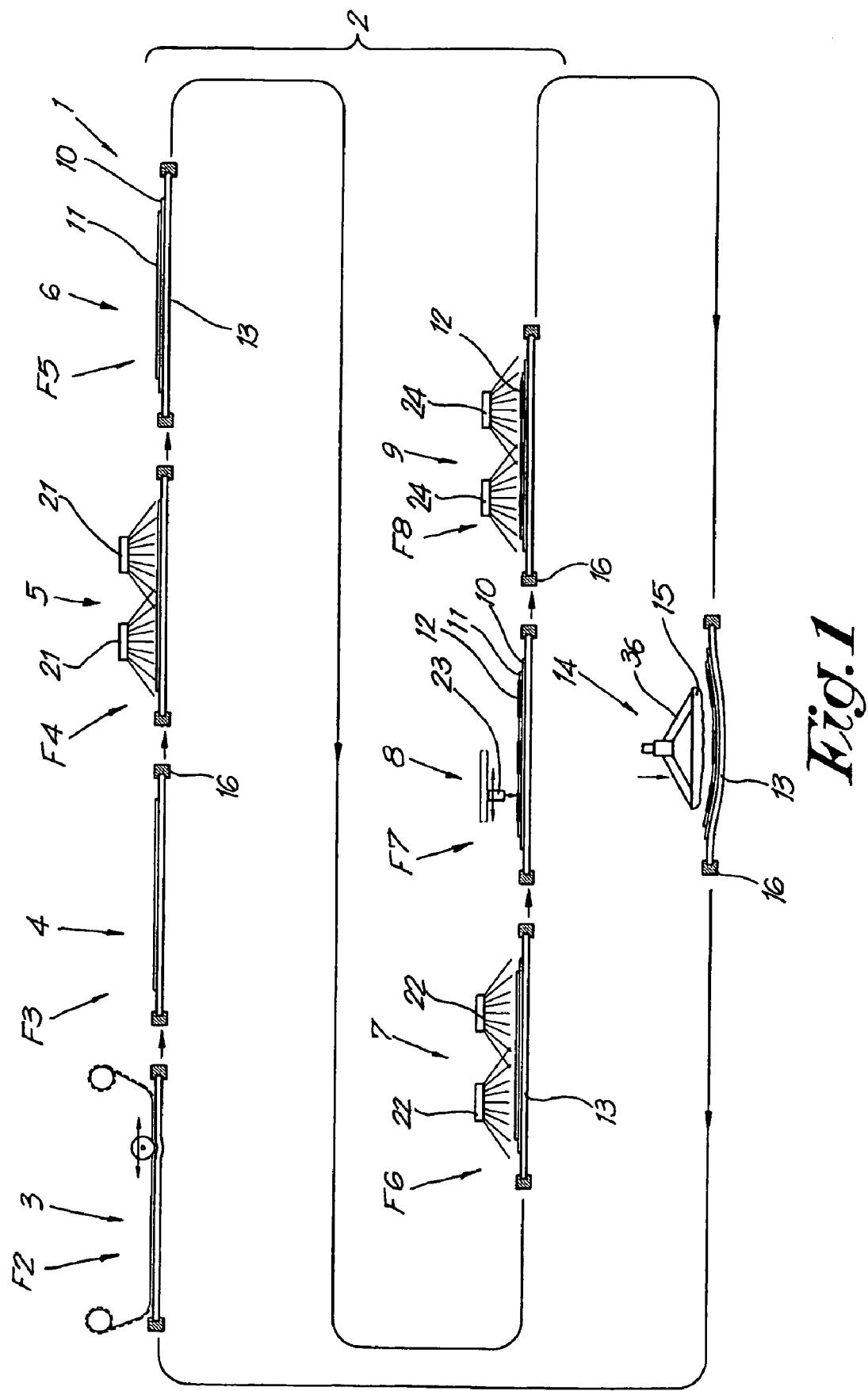
Figure 2:
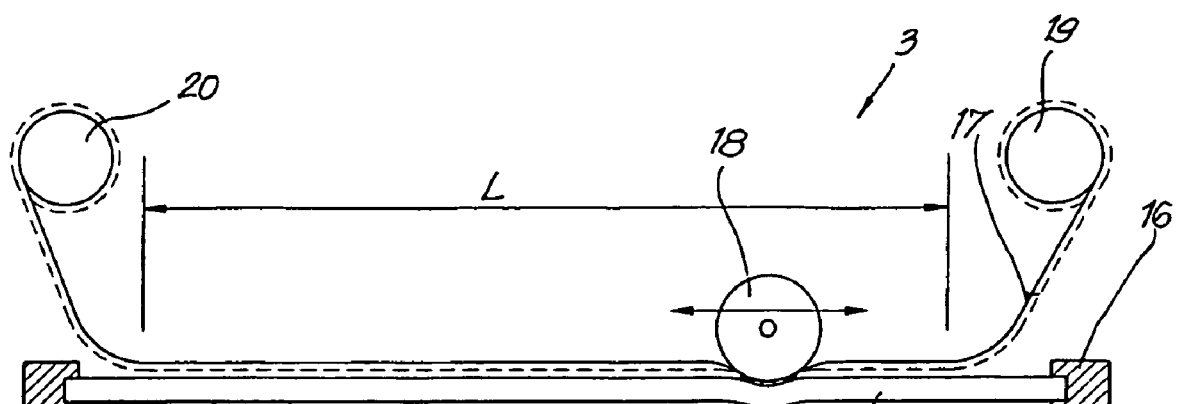

| | | | | |
|---|---|---|---|---|
| 4,233,358 | A | * | 11/1980 | Jones et al. .................... 442/86 |
| 4,391,853 | A | * | 7/1983 | Pointon ....................... 427/152 |
| 5,890,429 | A | | 4/1999 | Alam et al. |
| 6,110,316 | A | * | 8/2000 | Kobayashi et al. .......... 156/230 |
| 6,254,712 | B1 | * | 7/2001 | Enlow et al. ........... 156/244.11 |
| 2004/0026017 | A1 | * | 2/2004 | Taylor et al. ................ 156/230 |
| 2004/0219302 | A1 | * | 11/2004 | Krause et al. ............... 427/496 |

FOREIGN PATENT DOCUMENTS

| | | |
|---|---|---|
| GB | 2 079 219 A | 1/1982 |
| JP | 60228190 | 11/1985 |
| JP | A 2-137993 | 5/1990 |
| JP | 9186435 | 7/1997 |
| JP | 2000-112256 | 4/2000 |
| WO | WO 00/61376 | 10/2000 |

\* cited by examiner

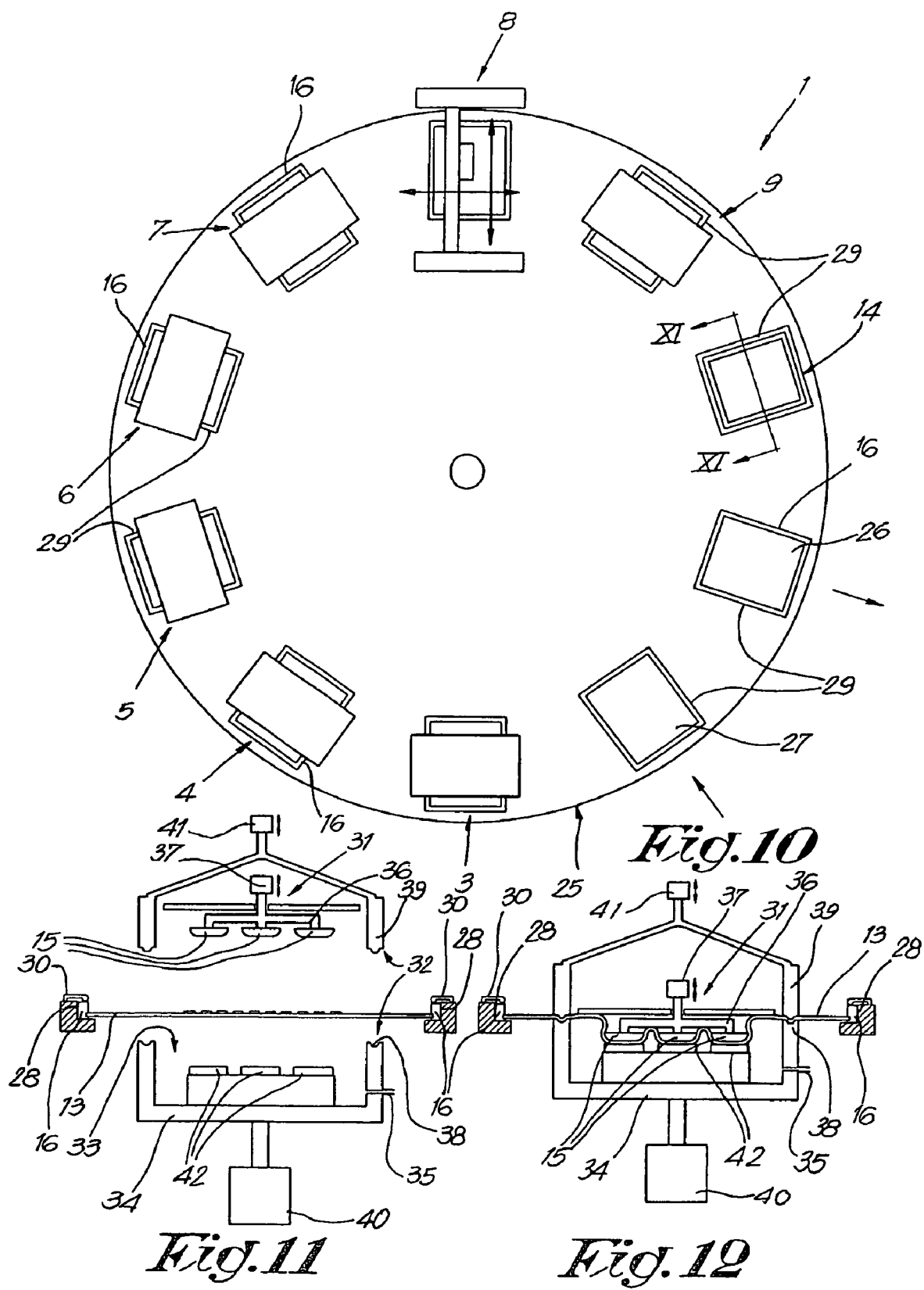

METHOD AND DEVICE FOR PRINTING OBJECTS

This invention relates to a method and device for printing objects.

In first instance, it is intended for printing three-dimensional surfaces, for example, the surface of irregularly formed objects, however, in general it can be applied for printing a variety of surfaces, thus, for example, flat surfaces, too.

A practical application intended by the invention is to provide a decorative coating on the housing of portable telephone devices, in particular on the front side of cellular phones.

A technique for printing such objects is known from the Belgian patent No. 1.012.584. According to this known technique, printing ink is provided on a supple carrier, and subsequently this printing ink is transferred onto the object by bringing the object and the carrier into mutual contact, whereby the carrier is forced to follow the form of the surface of the object to be printed.

When several layers must be printed one above the other, said technique may be repeatedly applied for each of these layers. However, applying successive layers in this manner has various disadvantages.

A first disadvantage consists in that repeatedly printing one and the same object is a complicated and time-consuming technique.

A second disadvantage consists in that a possible interaction between two successive layers of printing medium, in case such interaction is desired, is almost excluded, as, when the layers are provided on the object one after the other, a drying already will take place in between.

A third disadvantage consists in that it is very difficult to provide the different prints in mutual respect right on top of each other, which is particularly important when working with patterns which must be coordinated in respect to each other. Due to the fact that the supple carriers may act somewhat differently with each printing cycle, it can be prevented that an undesired shifting between the patterns of the successive printings does occur.

The present invention aims at a method for printing objects which allows that a multi-layered print can be provided on these objects in an efficient manner, said method allowing that one or more of the aforementioned disadvantages can be excluded.

To this aim, the invention, in the first place, relates to a method for printing objects, whereby these objects are provided with a multi-layered print, with as a characteristic that to this aim, on one hand, two or more layers of printing medium, which are situated at least partially one above the other, are provided on a supple carrier and, on the other hand, these layers are simultaneously transferred to the object to be printed, by bringing said carrier, together with the layers of printing medium present thereon, and the object into mutual contact.

As the aforementioned layers of printing medium are provided on the carrier one above the other, the advantage is created that the object can be provided with a multi-layered print by means of a single printing cycle, which results in a considerable saving of time.

As the layers of printing medium can be provided on the carrier relatively short after one another, it is easy to provide for an interaction of the printing media.

In consideration of the fact that the layers of printing medium are simultaneously provided on the object, a possible mutual shifting of printing patterns as a result of deformations occurring during the transfer of said layers to the object is completely excluded.

According to a preferred characteristic of the invention, in between the application of two or more layers of printing medium, and possibly after applying the last layer of printing medium, one or more of said layers are subjected to a curing treatment, more particularly a drying process. Depending on the purpose, this may be a complete curing or drying, as well as a partial curing or drying.

By a complete curing, more particularly, drying, it can be effected that the different layers of printing medium do not influence each other.

By a partial curing, more particularly, drying, different effects can be intended. A first aim consists in that the layer of printing medium which is cured, dried, respectively, is rendered less sensitive to dust particles. Dust particles actually will adhere less, the drier the respective layer of printing medium is. Thereby, the risk is reduced that, when realizing the method, dust particles end up in the print.

By a partial curing, the different layers, by chosing a suitable degree of curing, can be optimally conditioned in function of the treatments which have to be performed further therewith, for example, in function of the adherence which has to be realized with the subsequent layer of printing medium, and/or in function of the adherence to be realized with the object.

Said curing may be a drying, obtained by evaporation of volatile components, as well as so-called curing as a result of chemical reaction. Preferably, for the curing use will be made of an exposure to ultraviolet radiation or of heating, this latter, for example, by means of an infrared radiation.

In the case that at least two successive layers of printing medium are subjected to a curing treatment, the curing, according to a preferred form of embodiment, shall take place in a selective manner, and such that, when curing the second layer, little or no further curing of the first layer takes place. This has as an advantage that both layers can be partially cured, independently from each other.

Such curing in a selective manner preferably is performed by using layers of printing medium which cure by radiation, for example, by means of ultraviolet light, however, at different wavelengths of the radiation, and/or by using layers of printing medium which necessitate a different kind of treatment for their curing, for example, one one hand, a treatment by means of a radiation with ultraviolet light and, on the other hand, a treatment by means of infrared light.

According to a particular aspect of the invention, the carrier, previous to the application of the layers of printing medium, is cleaned, which can be realized in a practical manner by bringing the carrier into contact with an element which is provided with a self-adhesive layer, and subsequently removing said element from the carrier, such that contaminations possibly present on the carrier will remain at the self-adhesive layer.

For realizing the printing, a variety of printing media can be applied. In practical applications, however, two or more layers of printing medium, chosen from the following series, will be used: a top layer in the form of a transparent varnish, a primer or basic layer, and an ink.

Hereby, for the top layer preferably a varnish is used which can be cured by means of radiation with ultraviolet light or such. For the primer, preferably a printing medium is used having the features that it has a good adherence to synthetic material and that it absorbs printing ink. For the ink, preferably a water-based kind of ink is used.

It is noted that the application of at least two layers of printing medium, whereby the one printing medium is chosen such that it becomes at least partially absorbed in the other printing medium, forms a particularly advantageous fact for realizing certain prints. This technique anyway allows to realize the absorbing printing medium such that it shows optimum characteristics for providing for an adherence to the underlying material, whereas the absorbed printing medium then can be chosen such that optimal illustrations and/or colours are realized.

Providing the different layers of printing medium on the carrier can be performed in any suitable manner. An advantage of the invention consists in that different manners can be combined, in other words, that successive layers can be provided on the carrier by means of different techniques. Preferably, however, use shall be made of one or more of the following techniques: by means of screen-print, by a printer, by tampon printing.

Preferably, the method is realized by means of a flat carrier in the form of a membrane. The application of a flat carrier has as an advantage that it can easily be positioned and consequently each layer of printing medium can be applied on the right place. Such flat carrier also offers the advantage that, as long as it is kept in flat condition, always retains the same shape, such that the possible mutual coordination of different patterns exclusively depends on positioning the carrier, and such that other influences are excluded.

In the most preferred form of embodiment, use shall be made of carriers which are moved, by means of a closed circuit, along different processing stations and an actual printing device, wherein the respective layers of printing medium successively are provided on the carriers, these layers possibly are subjected to drying and finally, in said printing device, are simultaneously transferred onto the object to be printed. Thereby, a production in series can be provided in an efficient manner.

Of course, the invention also relates to devices for realizing the aforementioned method. These devices substantially are characterized in that they at least consist of, on one hand, means, more particularly processing stations, for successively providing two or more layers of printing medium on a supple carrier, and, on the other hand, an actual printing device, where said layers are transferred onto the object to be printed, by bringing said carrier, together with the layers of printing medium present thereon, and the object in mutual contact. For the processing stations, amongst others, processing stations can be used where printing medium is applied on the carrier by means of screen-print, printing or tampon printing; processing stations where an at least partial curing or drying of already applied layers of printing medium takes place; and processing stations where a cleaning of the carrier is performed.

According to a preferred form of embodiment, the device comprises several carriers, which successively are brought into the different processing stations and the actual printing device. By using several carriers, the advantage is created that different treatments simultaneously can be carried out on the respective carriers and that the actual printing treatments can be performed shortly one after the other, without each time having to wait until one carrier has been run through a full cycle.

Still more particularly, it is preferred that said carriers are taken up in one and the same transport device, such that, after each treatment, they are simultaneously moved to a successive processing station, the printing device, respectively. In a practical form of embodiment, to this aim use will be made of a rotatable table on which the different carriers are provided and whereby the aforementioned processing stations and the actual printing device are installed along the periphery of this table.

According to a preferred form of embodiment, the device is provided with exchangeable carriers, more particularly carriers which are attached in holders, preferably in the form of a membrane attached to a frame, whereby these holders, together with the carriers attached thereto, are mounted in the device in a replaceable manner.

Moreover, the invention also relates to a printing device for printing objects, of the type whereby printing medium is transferred onto an object by bringing a carrier, provided in a holder and being provided with printing medium, into contact with the object, such that the printing medium is transferred from the carrier onto the object, with as a characteristic that the printing device comprises means which grip, more particularly, clamp, the carrier within the circumference determined by the location where the carrier is connected to the holder. Amongst others, this has the advantage that the attachment of the carrier at the holder, during the realization of the actual printing process, whereby, as known, tensile loads are created in the carrier, remains unloaded.

Further, the invention also relates to a printing device for printing objects, of the type whereby printing medium is transferred onto an object by bringing a carrier, which is provided with printing medium, into contact with an object, such that the printing medium is transferred from the carrier onto the object, characterized in that the printing device comprises a chamber-shaped part which is open at one side, whereby the open side thereof can be sealed by a carrier presented in the printing device, such that the chamber-shaped part forms a chamber in which a pressure can be created having the purpose of assisting in pressing the carrier around the object.

The use of such chamber-shaped part which is brought into contact with a carrier presented thereto, has as an advantage that carriers of any kind can be presented to the printing device, and that such carrier can be provided with printing medium beforehand, at another location, in other words, that the printing medium must not be applied on the carrier in the actual printing device.

The aforementioned printing devices, in other words, the printing devices which, as aforementioned, comprise means for clamping a carrier, as well as the printing devices which, as aforementioned, comprise an open chamber-shaped part in which a pressure can be created, are particularly suited for being applied in a device which, as aforementioned, also comprises different processing stations and whereby carriers successively can be presented to these processing stations and the printing device. However, according to the invention, these printing devices also can be applied separately, thus, without having to form a part of a circuit consisting of processing stations and a printing device.

With the intention of better showing the characteristics of the invention, hereafter, as an example without any limitative character, a preferred form of embodiment of the invention is described, with reference to the accompanying drawings, wherein:

FIG. 1 schematically represents an application in which the method according to the invention is applied;

FIGS. 2 to 9 schematically, at a larger scale, represent views of the parts indicated by arrows F2 to F9 in FIG. 1;

FIG. 10 schematically represents a practical form of embodiment of the device according to the invention;

FIGS. 11 and 12, for two different conditions, and for a practical form of embodiment, represent a cross-section according to line IX-IX in FIG. 10.

As represented, the device 1 from FIG. 1 substantially consists of, on one hand, means 2, more particularly processing stations 3 to 9, for successively providing two or more layers of printing medium, in this case, three layers, 10-11-12, respectively, on a supple carrier 13, and, on the other hand, an actual printing device 14 where said layers 10-11-12 are transferred to an object 15 to be printed by bringing the carrier 13, together with the layers 10-11-12 present thereon, and the object 15 into mutual contact.

As is better shown in FIGS. 2 to 9, the carrier 13 is realized as a flat membrane which, in the represented example, is attached in a holder 16. To this aim, preferably a silicone mat is used, for example, with a thickness of 1 to 3 mm, and preferably 2 mm.

In the processing station 3, the carrier 13 is cleaned. As represented schematically in FIG. 2, this is preferably performed by bringing the carrier 13 into temporary contact with an element 17 which, at its underside, is provided with a self-adhesive layer, such that, when the element 17 is removed again, all dust particles present on the carrier 13 are taken up by the self-adhesive layer.

In the represented example, the element 17 consists of a film or such which, with a self-adhesive layer present at the underside thereof, is pressed on the carrier 13 for a short time by moving a pressing element 18, more particularly a pressing roller, thereover. After having cleaned the carrier 13 in this manner, said carrier is moved to the next processing station 4. The self-adhesive film can consist of a band which can be moved between two rollers 19-20, whereby, for example, after each cleaning cycle, this band is moved on over a length L, such that, with a subsequent cleaning cycle, a clean self-adhesive layer is available.

Figure 3:
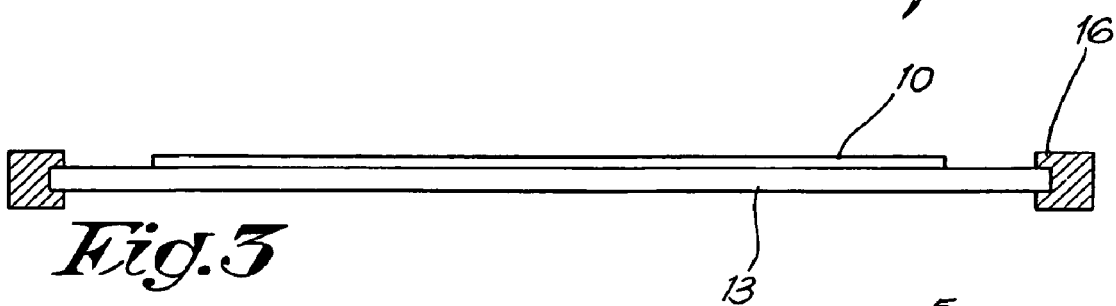

As represented in FIG. 3, in the processing station 4 the first layer of printing medium 10 is applied on the carrier 13. In the represented example, this is a top layer of transparent varnish, more particularly varnish of the type which can be cured by means of an exposure to ultraviolet light. The application of this top layer on the carrier 13 can be realized in any manner, for example, by providing it on the carrier 13 by means of screen-print, by spraying it on the carrier 13, by providing it on the carrier 13 by means of a roll, etc.

Figure 4:
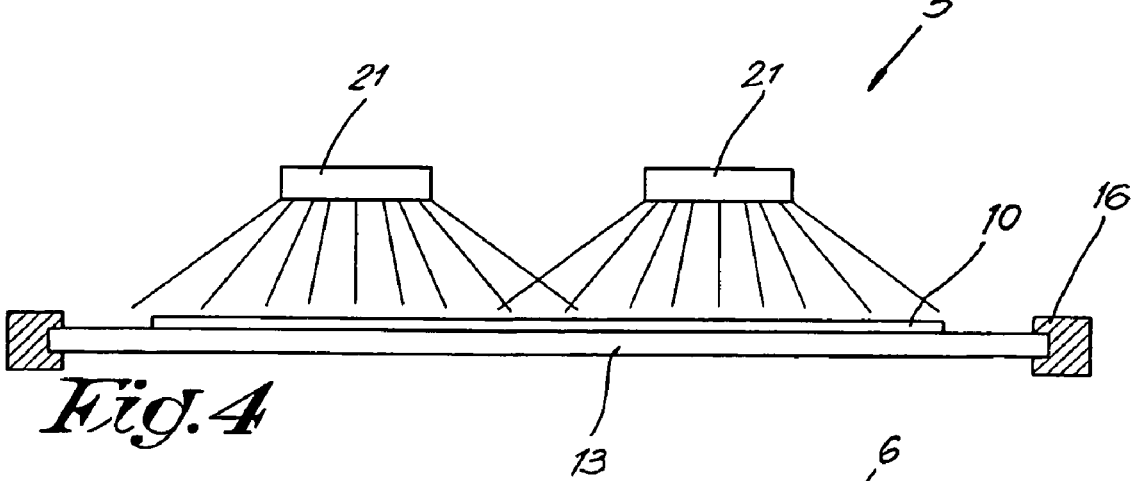

In the processing station 5, a partial curing of the layer of printing medium 10 is taking place. Hereby, the carrier 13, with the layer 10 present thereon, as represented in FIG. 4, is brought under one or more sources 21 of ultraviolet radiation. Amongst others, this partial curing has the purpose to provide for minimizing the risk that dust particles possibly floating around might get stuck in the layer of printing medium 10. Also, the layer 10, by the partial curing, is conditioned such that it shows optimum characteristics for receiving the subsequent layers thereon.

Figure 5:
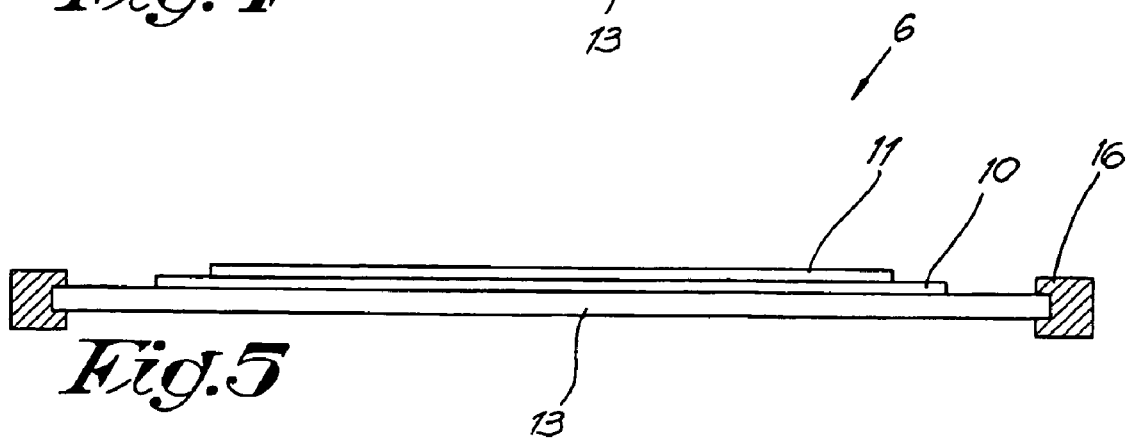

In the processing station 6, the second layer of printing medium 11, as represented in FIG. 5, is provided on the first layer of printing medium 10. In the represented example, the layer 11 consists of a primer or basic layer which is chosen such that it has the features of adhering well to the material, for example, synthetic material, of which the object consists, as well as it is suited to absorb the printing ink applied in a next stage.

The application of the layer 11 can also be performed in any manner whatsoever. Preferably, however, to this aim also one of the aforementioned techniques will be applied.

Figure 6:
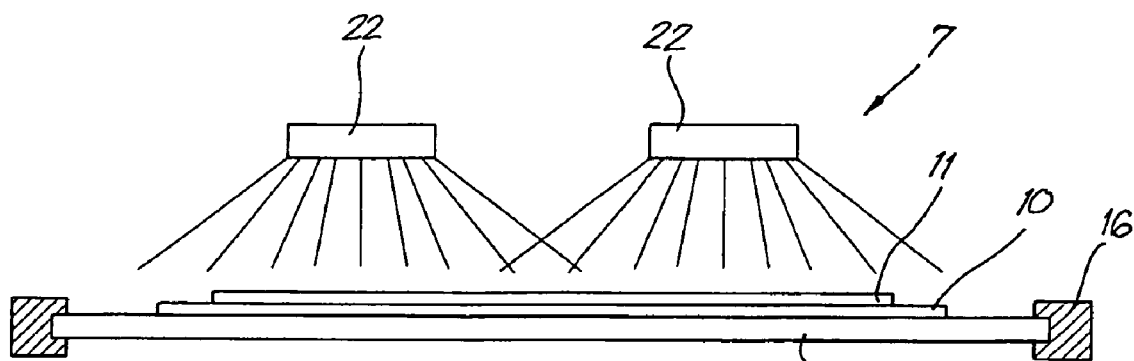

As represented in FIG. 6, in the processing station 7 also a partial curing takes place by radiation by means of, for example, ultraviolet radiation sources 22. In order to prevent that the top layer, in other words, the layer 10, hereby cures further, a selective curing is applied. Hereby, it is intended that in the processing station 7, a treatment of such kind is performed that solely the layer 11 is subjected to a curing, whereas no or almost no further curing of said layer 10 takes place. Practically, this is, for example, realized by choosing printing media for the layers 10 and 11 which cure at different radiation frequencies in the ultraviolet range. By then applying ultraviolet light or such of a well-defined frequency, a selective processing can be performed.

Figure 7:
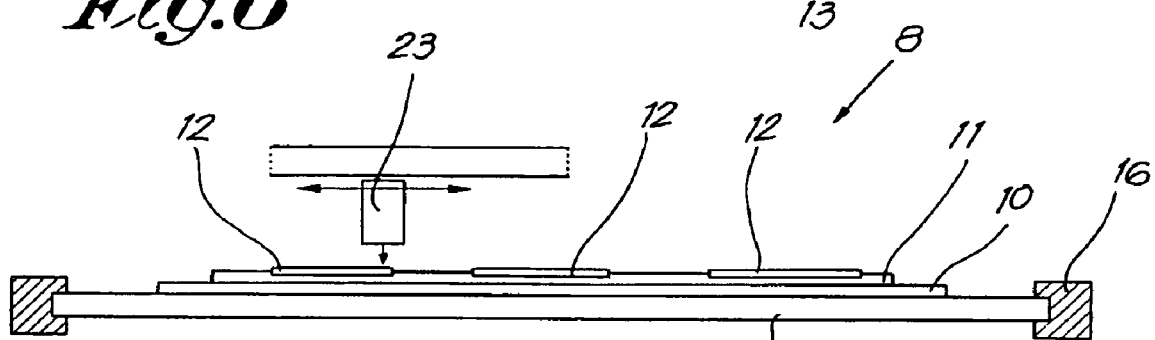

In the processing station 8, the third layer 12 is applied, which, in the represented example, consists of a printed pattern. In a particularly practical form of embodiment, the application thereof, as represented in FIG. 7, shall take place by means of a printing head 23 of a printer, said printing head moving over the carrier 13 and printing, for example, an image in one or more colours on the layer 11.

For realizing the layer 12, use can be made of water-based printing inks. The printing medium of which the layer 12 is formed, in other words, the printing ink, hereby at least partially penetrates into the underlying layer 11.

Figure 8:
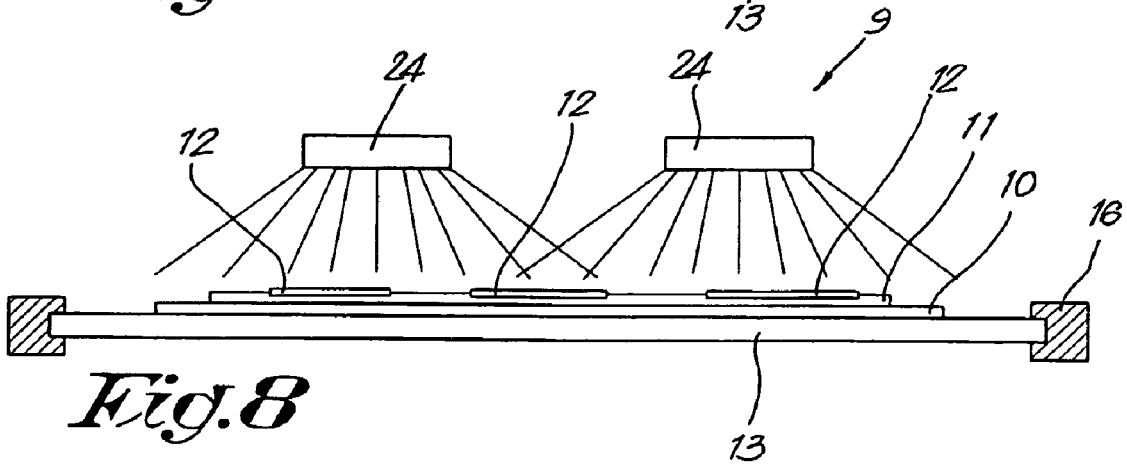

Subsequently, in the processing station 9 a further curing, more particularly drying, takes place, in this case, by heating, for example, as represented in FIG. 8, by radiating with infrared light originating from infrared lamps 24, with as a result that the water from the water-based ink evaporates from the layer 12, as a consequence of which the pigments of the layer 12 become fixed in the layer 11.

Figure 9:
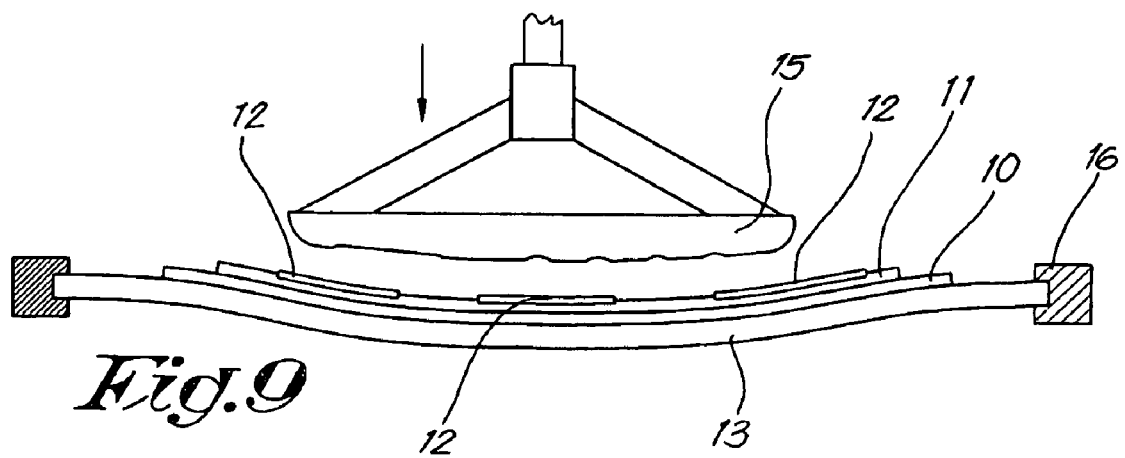

Finally, the carrier 13 is brought into the actual printing device 14, and the object 15 and the carrier 13, as represented in FIG. 9, are brought into mutual contact, such that the print formed by the layers 10-11-12 is transferred as a whole onto the object 15. In other words, when the object 15 is removed from the carrier 13, the layers of printing medium 10-11-12 remain on the object 15.

It is noted that in FIGS. 1 to 9, the carrier 13 as well as the layers 10-11-12 are represented exaggeratedly thick and that in reality, they are considerably thinner. After the object 15, which, for example, consists of a front panel of a portable phone device, is printed, it is clear that the layer 10 shall be situated at the outer side. Hereby, this layer 10 forms a hard transparent top layer. Through this layer 10, the layer 11 is visible, as well as the layer 12 absorbed in this layer 11, which layer 12, for example, represents a pattern, inscription or the like.

Although the use of the layers of printing medium 10-11-12 described specifically in the aforegoing, according to the invention offers important advantages, it is clear that the invention is not restricted to the specific use of these layers. The invention, however, in general relates to the fact that two or more layers of printing medium are applied on a carrier and subsequently are simultaneously transferred onto the object.

As schematically represented in FIG. 1, the device 1 comprises several carriers 13, which successively are brought into the different processing stations 3 to 9 and the printing device 14, such that, each time the carriers 13 are placed into a subsequent processing station, also a carrier 13 is brought into the printing device 14 and a printing cycle can be performed.

As schematically represented in FIG. 10 in a top plan view, the carriers 13 to this aim preferably are provided in a rotatable table 25, whereby said processing stations 3 to 9, as well as the printing device 14, are installed along the periphery of this table 25. When the carriers 13, immediately after performing the printing, can be re-used, they can remain present in the device 1, such that they automatically end up in the processing station 3. When the carriers 13, however, are not immediately re-usable, for example, as a result of the presence of a surplus of printing medium thereupon, these carriers, for example, can be removed in stations 26, whereas new and/or cleaned carriers 13 are provided in the table 25 in the station 27. It is also possible to provide a cleaning device at the location of station 26 and/or 27 in order to remove surplus printing medium.

Although the carriers 13 can be fixed in the table 25 in different ways, preferably, as schematically represented in FIG. 11, use is made of carriers 13 attached to a holder 16, whereby the holders 16, together with the carriers 13 attached thereto, are mounted in openings 28 in the table 25, more particularly are retained at their edges in seats 29 by clamping means 30.

In a schematic manner, FIGS. 11 and 12 represent how the printing device 14 preferably is composed.

This printing device 14 is provided with means 31 for moving the objects 15 to be printed and the carrier 13 in mutual respect and to bring them into mutual contact; means 32 for gripping, more particularly, clamping, the carrier 13 within the circumference which is determined by the location where the carrier 13 is connected to the holder 16; and a chamber-shaped part 34 which is open at one side 33, whereby the open side 33 thereof can be sealed by the carrier 13, such that, by means of a compressed air connection 35, a pressure can be created in the chamber.

The means 31 consist of a holder 36 at which the objects 15 are fixed, and a drive 37 for moving this holder, such that the objects 15 are pressed against the carrier 13. The means 32 are formed by, on one hand, the upper edge 38 of the part 34 and, on the other hand, a pressing part 39 situated at the other side of the carrier 13, as well as by drives 40 and 41 which allow to move the part 34 and the pressing part 39 towards each other, such that the carrier 13 is clamped in between them.

In the part 34, countermoulds 42 can be installed.

The printing device 14 functions as described in the following. In rest position, the printing device 14 is in a condition as represented in FIG. 11. When the carrier 13 with the layers of printing medium 10-11-12 present thereupon is situated between the part 34 and the pressing part 39, these are moved towards each other, with as a consequence that the carrier 13, as represented in FIG. 12, is clamped. Subsequently, the objects 15 are pressed against the carrier 13, such by moving these objects 15 downward until the carrier 13 is in contact with the countermoulds 42. Preferably, then a pressure is created in the chamber-shaped part 34 to provide for that the carrier 13 folds around the objects. In this manner, the layers 10-11-12 are simultaneously transferred onto the objects 15.

Finally, the parts of the printing device 14 are brought back into the condition of FIG. 11, after which a subsequent carrier 13, provided with layers of printing medium 10-11-12, can be presented in the printing device 14, of course, the printed objects 15 are removed from the holder 36 and new objects 15 to be printed are provided therein, which either can be realized automatically or not.

The present invention is in no way limited to the forms of embodiment described as an example and represented in the figures, however, such method and device for printing objects can be realized according to various variants, without leaving the scope of the claims.

The invention claimed is:

1. A method for printing objects, with a multi-layered print, the method comprising, providing two or more layers of printing medium, at least partially situated one above the other, on a supple carrier, subjecting at least one of said layers to a partial curing treatment simultaneously transferring said layers onto the object to be printed by bringing said layers of printing medium on said carrier and the object into mutual contact, and removing the object from the carrier after the transfer of said layers is completed, and wherein the method is carried out with a device comprising several carriers along a closed circuit, which successively are brought into different processing stations and a printing device, wherein the different processing stations comprise at least one of a processing station where an at least partial curing or drying of already applied said layer of printing medium takes place, a processing station where a cleaning of said carrier is performed, and a processing station where said printing medium is applied on said carrier by means of screen-print, printing, or tampon printing.

2. The method according to claim 1, further comprising curing one or more of said layers between the application of two or more layers of printing medium.

3. The method according to claim 2, further comprising curing at least a first layer and a second layer, in a selective manner, such that, when curing the second layer, little or no further curing of the first layer occurs.

4. The method according to claim 1, further comprising, cleaning the carrier prior to the application of the layers of printing medium.

5. The method according to claim 4, further comprising bringing the carrier into contact with an element provided with a self-adhesive layer, and subsequently removing the element from the carrier, such that any contamination present on the carrier is removed on the self adhesive layer.

6. The method according to claim 1, wherein the object is printed with two or more layers of printing medium selected from the group consisting of a transparent varnish, a primer or basic layer, and an ink.

7. The method according to claim 1, wherein one printing medium is at least partially absorbed in a second printing medium, and the second printing medium adheres to an underlying material which it contacts.

8. The method according to claim 1, wherein the carrier is a flat carrier in the form of a membrane.

9. The method according to claim 1, further comprising, moving a plurality of carriers along a closed circuit, comprising different processing stations and a printing device, providing the respective layers of printing medium successively on the carriers, optionally subjecting the layers to a drying process, and, in said printing device, simultaneously transferring the layers onto the object to be printed.

10. The method according to claim 1, during the transfer of said layers onto the object, the carrier is brought into contact with a support for the carrier around the object to be printed, providing a clamping of the carrier.

11. The method according to claim 1, wherein, during the transfer of said layers onto the object, the carrier is brought into contact with a chamber-shaped part which is open at one side, such that the open side is sealed by the carrier, and a chamber is formed in which pressure is created pressing the carrier around the object.

12. A device for printing objects, comprising two or more processing stations configured to successively provide two or more layers of printing medium on a supple carrier, and a printing device configured to bring the layers of printing medium on the carrier in contact with the object to be printed, thereby transferring said layers onto the object, the device further comprising several carriers, configured to be successively brought into the two or more processing stations and the printing device.

13. The device according to claim 12, further comprising a rotatable table, having a plurality of carriers in or thereon, such that, by rotating the table, the carriers are successively positioned in the respective processing stations and the printing device.

14. The device according to claim 12, wherein the printing device comprises a chamber-shaped part which is open at one side, wherein the open side thereof is configured for sealing by a carrier when present in the printing device, such that the chamber-shaped part forms a closed chamber with the carrier in which a pressure is created, thereby pressing the carrier around the object.

15. The device according to claim 13, wherein the printing device comprises a chamber-shaped part which is open at one side, wherein the open side thereof is configured for sealing by a carrier when present in the printing device, such that the chamber-shaped part forms a closed chamber with the carrier in which a pressure is created, thereby pressing the carrier around the object.

16. The method of claim 2, further comprising curing the one or more layers by exposure to ultraviolet radiation or by heating.

* * * * *

UNITED STATES PATENT AND TRADEMARK OFFICE
CERTIFICATE OF CORRECTION

PATENT NO. : 7,572,348 B2  Page 1 of 1
APPLICATION NO. : 10/516081
DATED : August 11, 2009
INVENTOR(S) : Marc Maria Leo Jan LaFaille It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1028 days.

Signed and Sealed this

Seventh Day of September, 2010

David J. Kappos
*Director of the United States Patent and Trademark Office*